Figure 1:
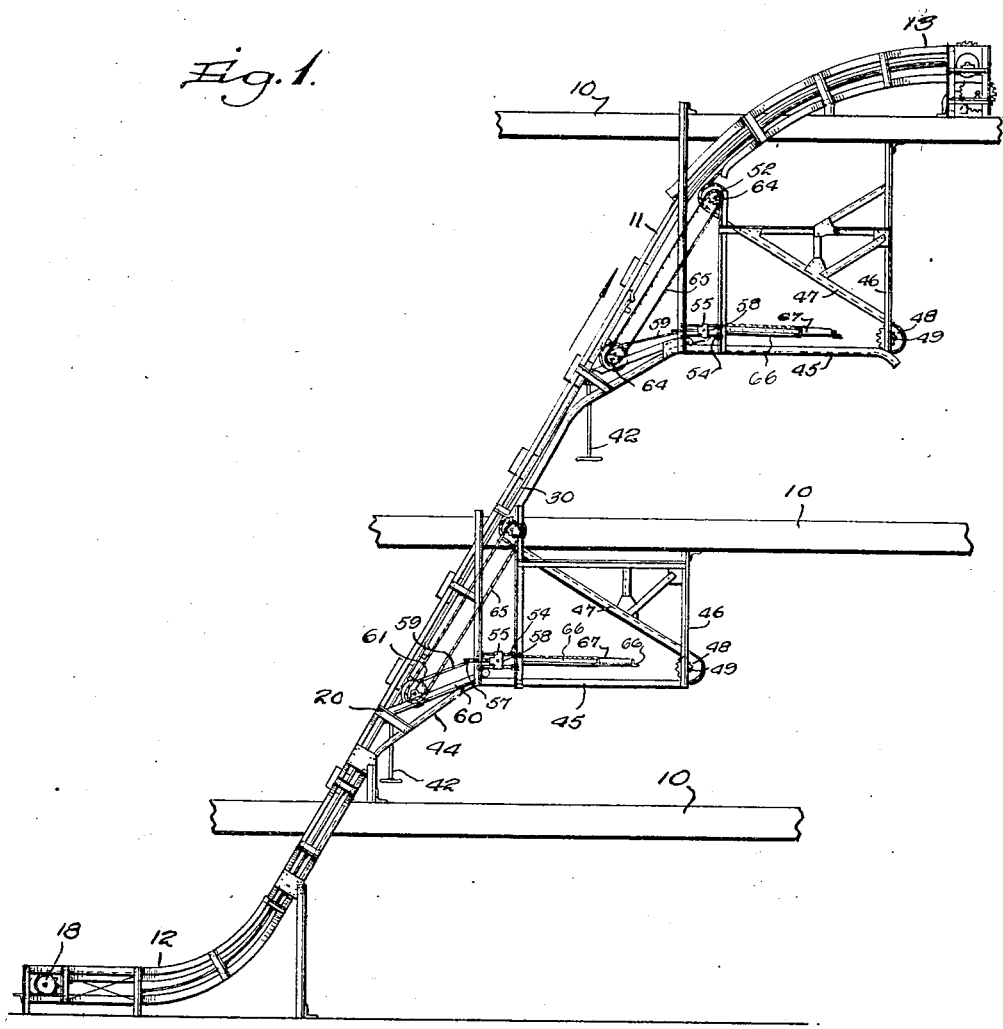

Dec. 24, 1929.  H. R. GOTTHARDT  1,740,921
CONVEYER
Filed Oct. 30, 1926  6 Sheets-Sheet 1

Inventor
HENRY R. GOTTHARDT
By
Attorney

Dec. 24, 1929.  H. R. GOTTHARDT  1,740,921
CONVEYER
Filed Oct. 30, 1926  6 Sheets-Sheet 2
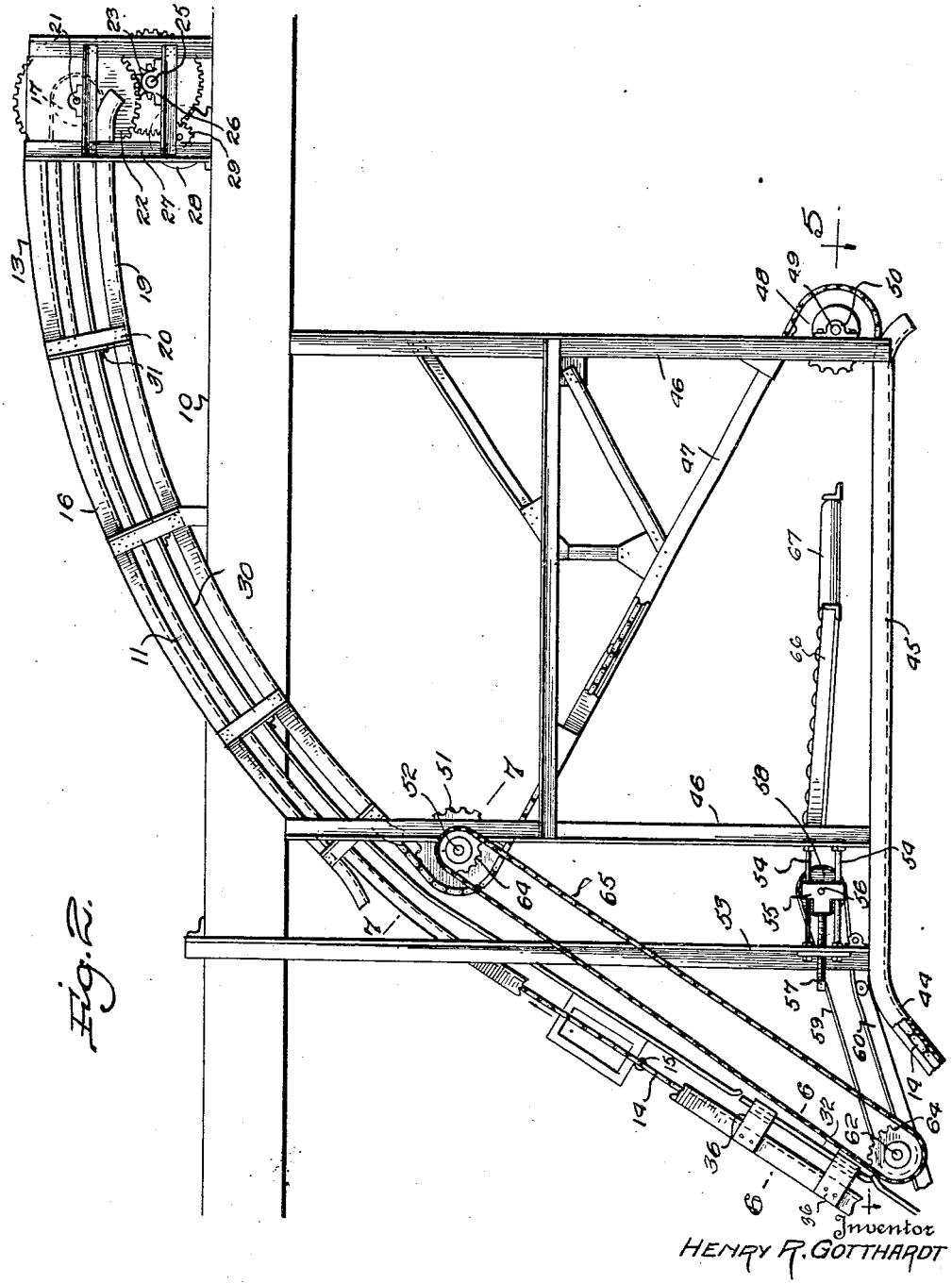

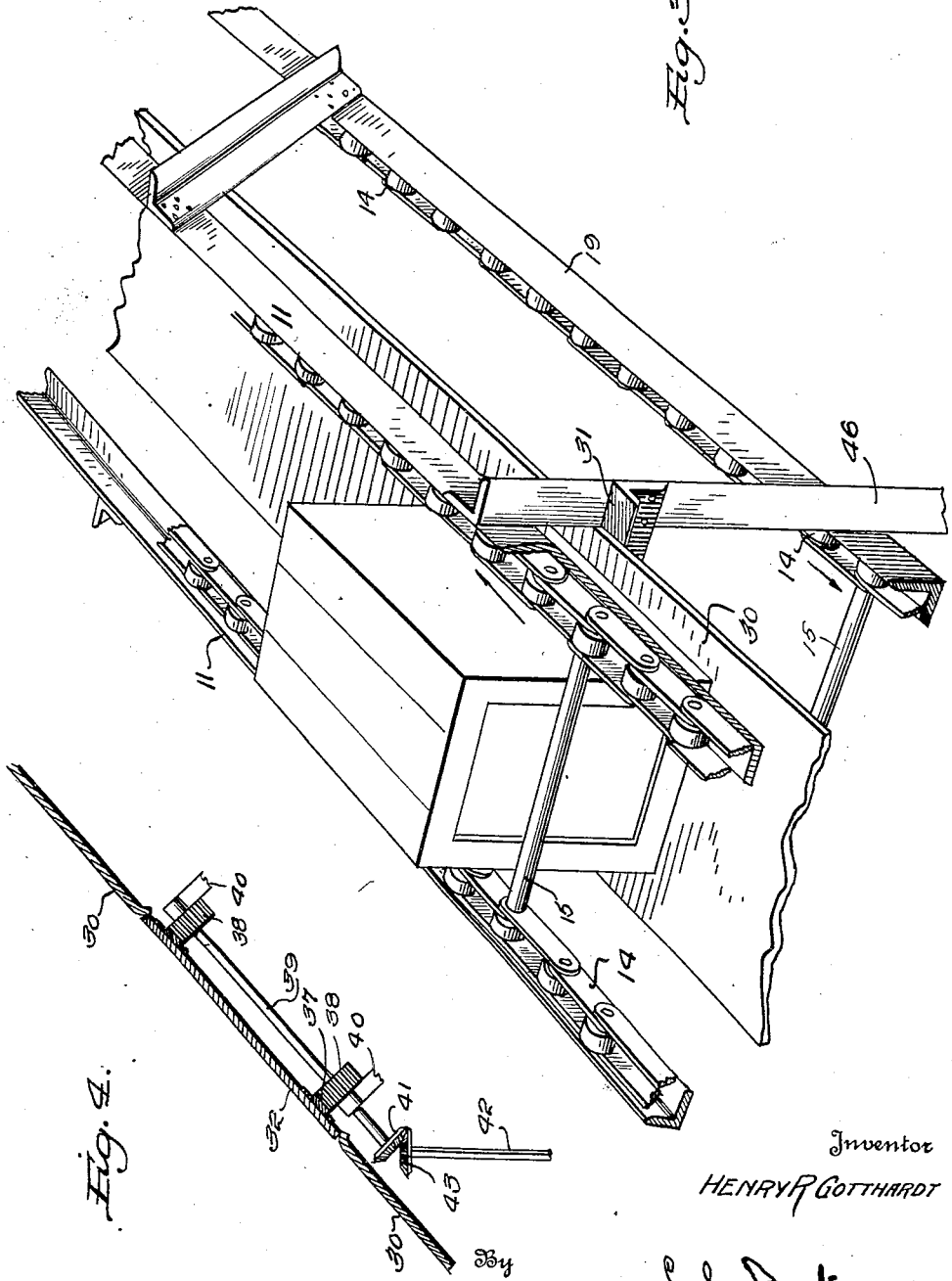

Dec. 24, 1929.   H. R. GOTTHARDT   1,740,921
CONVEYER
Filed Oct. 30, 1926   6 Sheets-Sheet 4
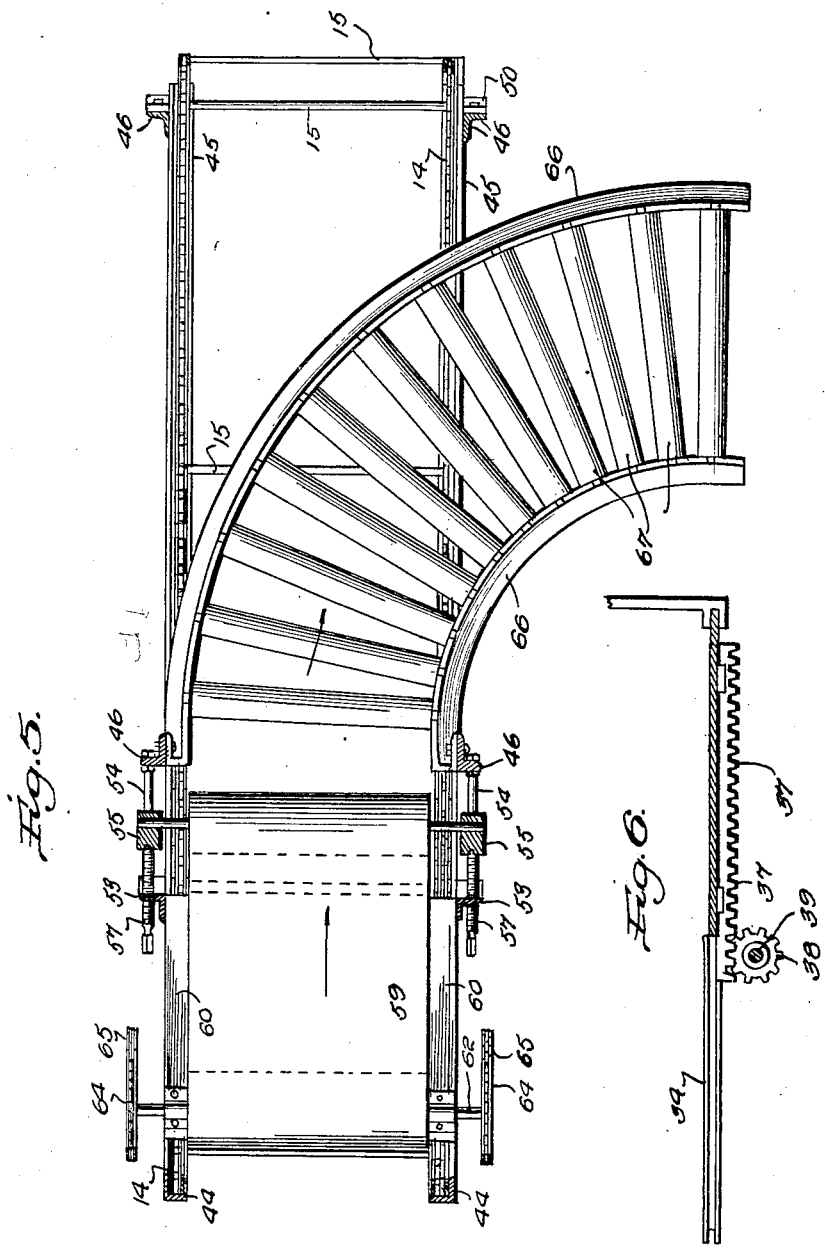
Inventor
HENRY R. GOTTHARDT
By
Attorney

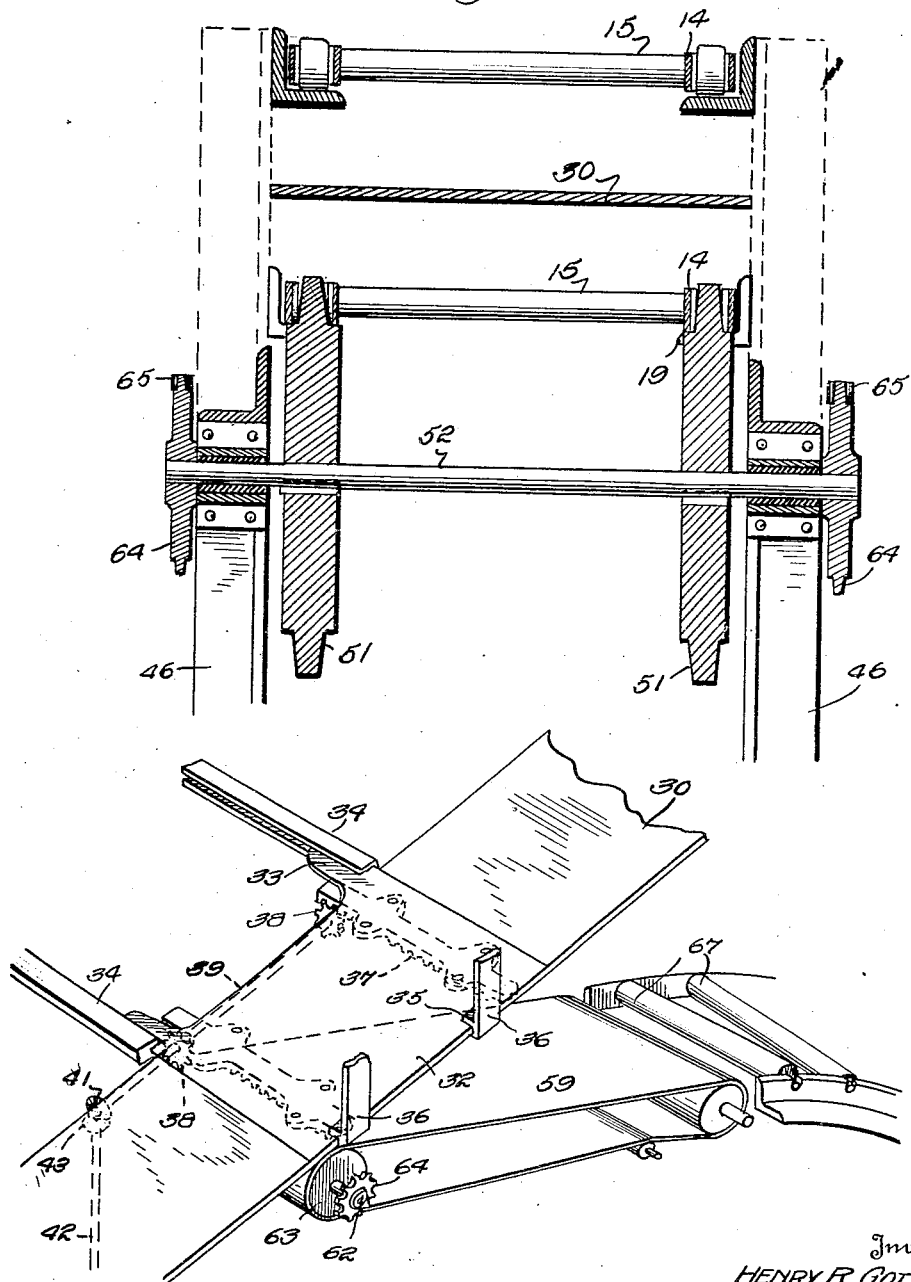

Dec. 24, 1929.   H. R. GOTTHARDT   1,740,921
CONVEYER
Filed Oct. 30, 1926   6 Sheets-Sheet 6
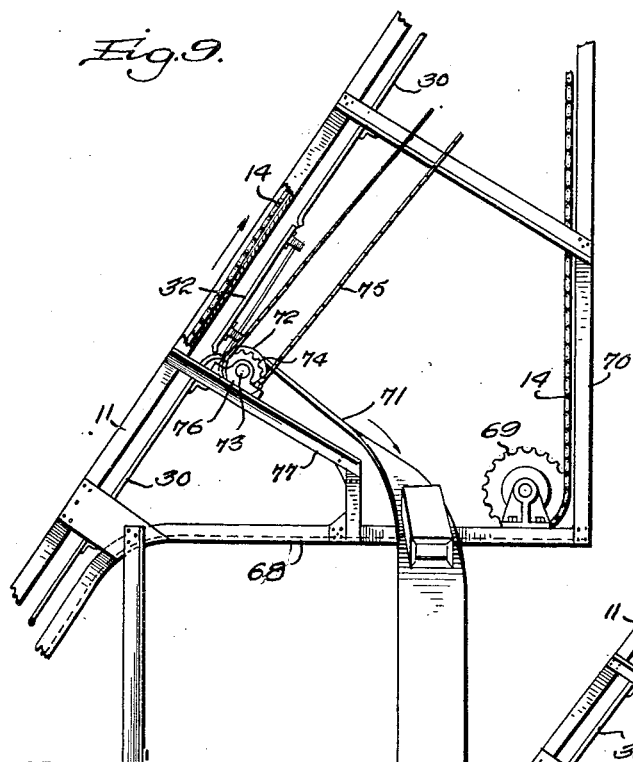
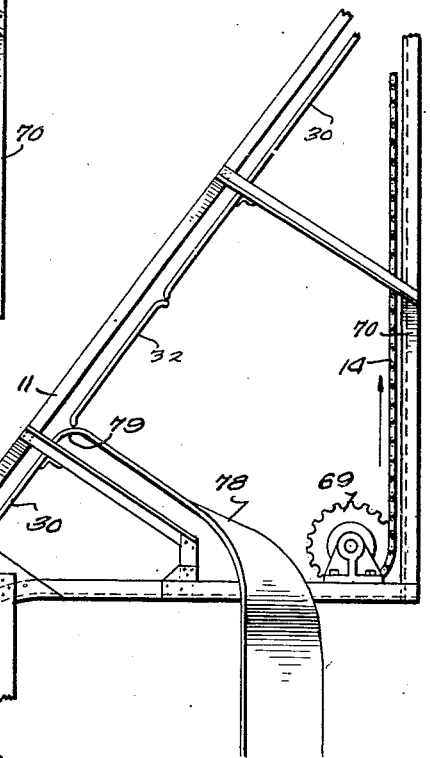
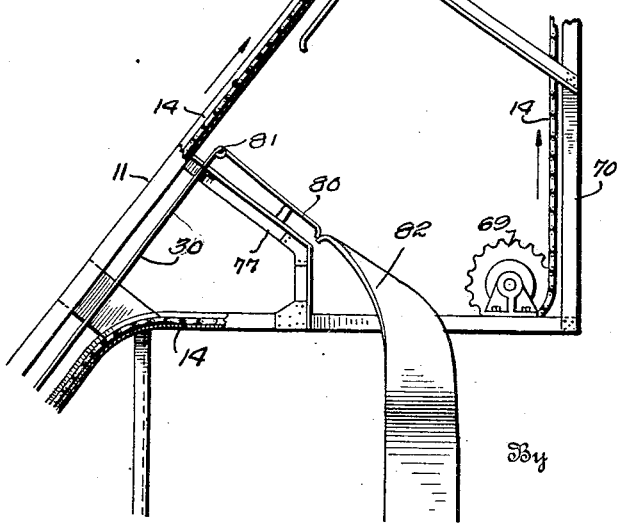
Inventor
HENRY R. GOTTHARDT
By
Attorney Patented Dec. 24, 1929

1,740,921

UNITED STATES PATENT OFFICE

HENRY R. GOTTHARDT, OF LOUISVILLE, KENTUCKY, ASSIGNOR TO LOGAN CO., OF LOUISVILLE, KENTUCKY, A CORPORATION OF KENTUCKY

CONVEYER

Application filed October 30, 1926. Serial No. 145,254.

This invention relates to conveying elevators, and more particularly to such a type of apparatus employing a movable conveying means adapted to move packages, boxes and the like, and a stationary member upon which the packages or the like are adapted to slide or roll whereby they may be delivered from the lower floors of buildings or the like to the upper floors thereof.

It is the common practice in conveyers of the type referred to, to employ a pair of spaced parallel chains connected at intervals by cross bars which are adapted to effect movement of packages, boxes or the like, the conveyers being provided beneath the cross bars with ramps of varying types along which the packages or the like are adapted to roll or slide. In such conveyers, it is necessary to use a separate conveyer for delivering packages to different floors of a building since it is impossible to discharge the packages at intermediate points. This system obviously requires the use of a number of conveyers, and a number of power sources for driving the conveyers.

An important object of the present invention is to provide a conveyer construction which is adapted to discharge packages or the like at intermediate points between its ends thus eliminating the necessity for a number of conveyers as above referred to.

A further object is to provide a conveyer wherein the return runs of the chains are offset at the desired intermediate takeoff points to permit the packages to be withdrawn from beneath the conveyer proper.

A further object is to provide a conveying apparatus of the character referred to wherein the ramp is provided at desired intermediate points with movable sections which may be moved from beneath the conveyer chains and cross bars to permit the packages to fall through the ramp.

A further object is to provide supplemental conveying means adapted to receive the packages discharged through the ramp at the intermediate discharge points referred to.

A further object is to provide means connected with the main conveyer for driving the supplementary conveyer.

Other objects and advantages of the invention will be apparent during the course of the following description.

In the drawings, I have shown several embodiments of the invention. In this showing, Figure 1 is a side elevation of one form of conveyer, Figure 2 is an enlarged side elevation of a portion of the conveyer, parts being broken away, Figure 3 is a perspective view of a portion of the conveyer, Figure 4 is a detail section showing one of the movable ramp sections, Figure 5 is a section taken substantially on line 5—5 of Figure 2, Figure 6 is a detail section taken substantially on line 6—6 of Figure 2, Figure 7 is a section on line 7—7 of Figure 2, Figure 8 is a perspective view of a portion of one of the supplementary conveyers and associated elements, Figure 9 is a fragmentary side elevation of another form of conveyer, Figure 10 is a similar view of a further modified form, and Figure 11 is a similar view of a still further modified form.

Referring to the drawings, and more particularly to Figures 1 to 8 thereof, the numeral 10 designates a plurality of floors of a building to which it is desired to selectively convey articles such as packages and the like. A pair of upper angle irons or other suitable chain supports 11 are arranged as shown in Figures 1 and 2, the lower ends 12 and upper ends 13 of the rails being arranged substantially horizontally. A pair of chains 14 are adapted to slide in the rails 11, and these chains are connected at spaced intervals by cross bars 15 which are adapted to effect movement of the packages in a manner to be described. The upper ends of the rails 11 are adapted to be reinforced by arcuate members 16.

The chains 14 pass over sprockets 17 at the upper end of the apparatus and about sprockets 18 at the lower end. The lower or return runs of the chains are adapted to travel upon angle iron or similar rail sections 19, and the upper or lower rails are secured together by braces 20. The sprocket 17 is mounted upon a shaft 21 which carries a gear 22, as shown in Figure 2. A pinion 23 meshes with this gear and is adapted to be rotated by another gear 24 mounted upon the same shaft 25. The shaft 25 is journaled in a bearing 26, and the drive means just described is adapted to be supported by a frame-work 27. The gear 24 is adapted to be driven by a motor 28 having a pinion 29 secured to its armature shaft and meshing with the gear 24.

A ramp 30 is arranged between the parallel to the rails 11 and 19 and packages or the like to be conveyed are adapted to slide upon this ramp as shown in Figure 3. The ramp may be supported by transverse angle irons or the like 31 secured at their ends to the braces 20 or at any other suitable points. The ramp is provided at spaced intervals with movable sections 32. In the form of the apparatus illustrated in Figures 1 to 8 inclusive, the movable ramp sections are slidable transversely to provide an opening in the ramp. As shown, the movable sections may be provided with laterally projecting portions 33 slidable in guides 34 and supported thereby when the movable sections are in operative position. When in the latter position, the movable ramp sections are adapted to be supported between the forked ends 35 of brackets 36 which may be secured at their upper ends to the rails 11. Each movable section is provided with a rack 37 secured against its lower face as shown in detail in Figure 6. A pair of pinions 38 are adapted to mesh with the racks 37 to effect movement of the movable ramp sections. Each pair of pinions 38 is mounted upon a shaft 39 journaled in suitable bearings 40 (see Figure 4) and is provided at one end with a beveled gear 41. An operating shaft 42 is provided for each movable ramp section, and this operating shaft is provided at its upper end with a bevel gear 43 meshing with one of the bevel gears 41.

In order to discharge packages through the opening provided when one of the movable ramp sections is moved out of normal position, it is desirable to offset portions of the lower runs of the chains 14. As shown in Figure 2, the lower runs of the chains are provided with offset portions corresponding to each of the movable ramp sections 32. Beneath each of the movable ramp sections, the lower rails 19 are provided with portions 44 which incline away from the ramp, and these inclined portions terminate at their upper and inner ends in horizontal portions 45. A pair of vertical supports 46 are secured against the ceiling above each of the horizontal rail portions 45 and are secured at their lower ends to the horizontal rail portions. The supports also are adapted to act as supporting means for upwardly inclined auxiliary rail sections 47 through which the chains are adapted to pass. The chains also are adapted to pass around sprockets 48 mounted upon a shaft 49 as shown in Figure 2. This shaft is journaled in a bearing 50 secured to one of the supports 46. It will be obvious that the chains are adapted to pass rearwardly over the rail sections 44, and 45, around the sprockets 48, and then upwardly and forwardly through the rail sections 47. From the latter rail sections the chains pass around sprockets 51, from whence they are again received between the rail sections 19. The sprockets 51 are mounted in bearings 52 carried by one of the supports 46. Supplementary conveying means may be provided for receiving packages discharged through the ramp. Referring to Figure 2, the numeral 53 designates a vertical support arranged parallel to one of the supports 46. Transverse slide bars 54 are connected between each support 53 and its adjacent support 46 and these bars slidably support bearings 55 carrying a shaft 56. A screw 57 is adapted to adjust the position of each bearing 55. The shaft 56 is provided with a pulley 58 around which a belt 59 passes. An auxiliary support 60 is connected between the lower end of each support 53 and one of the braces 20 (see Figure 1) and this auxiliary support is provided with a bearing 61 in which a shaft 62 is journaled. The belt 59 passes around a pulley 63 mounted on the shaft 62. Sprockets 64 are mounted on the shafts 52 and 62 and a drive chain 65 passes around these sprockets whereby the belt 59 may be driven. Referring to Figure 5, the numeral 66 designates a pair of arcuate rails which rotatably support rollers 67 upon which articles are adapted to be discharged from the belt 59. It will be apparent that the belt 59 and conveying rollers 67 constitute supplemental conveying means for discharging packages at any desired floor, and the packages are discharged from within the framework defined by the supports 46 and associated elements, whereby they may be conveniently handled.

In Figure 9 a somewhat modified form of the apparatus has been shown. In this form, the articles are adapted to slide upon a ramp 30 similar to the ramp previously described, and the actuating chains 14 and their cross bars are adapted to effect movement of the packages. This form of the device also is provided with a movable ramp section or door 32 which is adapted to be operated in the manner previously described. In this form of the apparatus, a lower horizontal rail section 68 is provided for receiving the lower run of each chain, and these portions of the chains pass around sprockets 69. A supporting frame-work 70 is provided for the rail sections 68, as shown. After the chains pass around sprockets 69, they extend vertically, to the points where they again pass into the rail sections 19. In this form of the invention, a stationary slide 71 is provided for receiving packages discharged from the ramp 30. The slide 71 is inclined as shown whereby the packages will slide to the floor by gravity. Movement of the packages to the slide is adapted to be facilitated by a roller 72 mounted on a shaft 73 and provided with a driving sprocket 74. A chain 75 passes around the sprocket 74 and is adapted to be driven in the same manner as the chain 65 previously referred to. The shaft 73 is journaled in bearings 76 mounted upon auxiliary supports 77.

The form of the invention shown in Figure 10 is identical with that just described except that the roller 72 is omitted. In this form, a slide 78 is provided which is curved at its upper end as at 79 and is connected with the next adjacent lower ramp section 30.

In Figure 11 of the drawings I have shown a somewhat modified form of apparatus employing a swinging ramp section 80 which is hinged at one edge as at 81 to the next adjacent lower ramp secton 30. The movable ramp section 80 is adapted to be swung to the position shown in Figure 11 with its lower edge arranged in alinement with a stationary slide 82.

In order to facilitate the operation of the device, the edges of the stationary ramp sections adjacent the movable sections thereof may be curved downwardly slightly as shown in Figure 2. Similarly the adjacent edges of the movable ramp section 80 and slide 82 may be curved, and it will be apparent that when this system of construction is followed, the packages freely may slide along the various elements described without danger of striking any of the edges of the stationary or movable ramp sections, or slides.

The operation of the apparatus is as follows:

Packages or boxes are placed on the lower end of the stationary ramp between the cross bars 15. The chains are adapted to be driven by the motor 28, and movement of the chains is adapted to effect movement of the packages or the like, as shown in Figure 2. When it is desired to convey the package from the lower floor of the building to the floor at which the upper end of the apparatus terminates, all of the movable ramp sections or doors will be arranged in closed position to provide in effect a continuous ramp. When it is desired to discharge a package at an intermediate point, one of the shafts 42 is rotated, thus rotating the corresponding shaft 39. One of the doors or movable ramp sections 32 will then be moved laterally by virtue of the engagement between the pinions 38 and rack bars 39. The edges of the doors slide in the guides 34, the free edges of the doors being supported by the brackets 36 when the doors are closed as will be apparent. When one of the doors is thus opened, a package reaching the open portion of the ramp will pass therethrough and on to the belt 59 from whence it will be discharged to the rollers 67. Any of the intermediate points may be selected according to the floor of the building at which it is desired to discharge the packages. After the action referred to, the previously opened door readily may be closed by reversing the rotation of the shaft 42. The belt 59 is adapted to be driven by the chains 65 which pass around the sprockets 64, the latter obviously being driven by the main conveyer chain thus eliminating the necessity for a separate source of power for the supplementary conveyer. The screw 57 is adapted to act as take-up means for tightening the belt 59. It will be apparent that the lower runs of the conveyer chains are adapted to pass through the auxiliary rail sections 44, 45 and 47, and consequently there will be no interference with the delivery of packages to intermediate points.

The operation of the forms of the device shown in Figures 9, 10 and 11, is substantially the same as in the form previously described. The opening of the door 32 in the form of the device shown in Figure 9 permits articles to be discharged upon the slide 71, the roller 72 serving to facilitate the movement of the package. It has been found, however, that packages which readily slide may be discharged directly from the stationary ramp to the stationary slide 78, illustrated in Figure 10. In the form of the device shown in Figure 11, the door 80 is swung to the position shown whereby packages may be delivered to the slide 82.

While the apparatus has been particularly described as an elevating means, it will be apparent that the direction of travel of the chains may be reversed for lowering packages, boxes and the like from upper to lower floors. The cross bars of the chains support the articles during their travel along the ramps in either case, and the doors or movable ramp sections can be employed with equal facility for discharging articles being lowered from upper to lower floors.

While separate operating means for the doors have been shown adjacent the various intermediate discharge points, it will be apparent that the shafts 42, or operating means therefor may be extended to a common control point.

It is to be understood that the forms of my invention herewith shown and described are to be taken as preferred examples of the same and that various changes in the shape, size, and arrangement of parts may be resorted to without departing from the spirit of the invention or the scope of the subjoined claims.

I claim:

1. A conveyer comprising a pair of stationary alined ramp sections having their adjacent ends spaced to provide an opening, a movable door normally closing said opening and forming a substantial continuation of said ramp sections, sprockets arranged adjacent opposite ends of said ramp sections, continuous conveyer chains passing around said sprockets and having portions arranged above and below said ramp sections, cross bars carried by said chains, sprockets arranged beneath said door and spaced a substantial distance therefrom, said chains being adapted to pass around said last named sprockets, and supplementary conveying means having a portion arranged between said last named sprockets and said door and adapted to receive articles passing through said opening.

2. A conveyer comprising a pair of stationary alined ramp sections having their adjacent ends spaced to provide an opening, a movable door normally closing said opening and forming a substantial continuation of said ramp sections, sprockets arranged adjacent opposite ends of said ramp sections, continuous conveyer chains passing around said sprockets and having portions arranged above and below said ramp sections, cross bars connecting said chains, and sprockets arranged beneath said door and spaced a substantial distance therefrom, said chains being adapted to pass around said last named sprockets.

3. A conveyer comprising a pair of stationary alined ramp sections having their adjacent ends spaced to provide an opening, a door normally closing said opening and forming a substantial continuation of said ramp sections, sprockets arranged adjacent opposite ends of said ramp sections, continuous conveyer chains passing around said sprockets and having portions arranged above and below said ramp sections, cross bars connecting said chains, sprockets arranged beneath said door and spaced a substantial distance therefrom, said chains being adapted to pass around said second named sprockets, and an arcuate supplementary conveyer having one end arranged beneath said door, the opposite end of said supplementary conveyer being adapted to discharge articles outwardly between the space between said door and said last named sprocket.

4. Apparatus constructed in accordance with claim 3 provided with chain supporting rails arranged above said ramp, and chain supporting means arranged adjacent the lower side of said ramp, said supporting means including a pair of sections having their adjacent ends spaced from each other beneath said door.

5. A conveyer comprising a pair of stationary alined ramp sections having their adjacent ends spaced to provide an opening, a movable door normally closing said opening and forming a substantial continuation of said ramp sections, sprockets arranged adjacent opposite ends of said ramp sections, continuous conveyer chains passing around said sprockets and having portions arranged adjacent opposite sides of said ramp sections, cross bars connecting said chains, sprockets arranged beneath said door and spaced a substantial distance therefrom, said chains being adapted to pass around said last named sprockets, supplementary conveying means having a portion arranged between said last named sprockets and said door and adapted to receive articles passing through said opening, means for driving said conveyer chains, and means operable by said conveyer chains for actuating said supplementary conveying means.

In testimony whereof I affix my signature.

HENRY R. GOTTHARDT.